J. ENGELKE.
Harness-Pads.
No. 147,115. Patented Feb. 3, 1874.
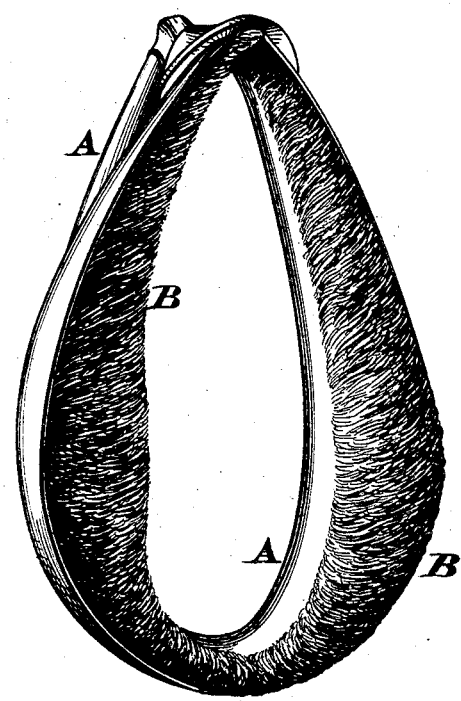
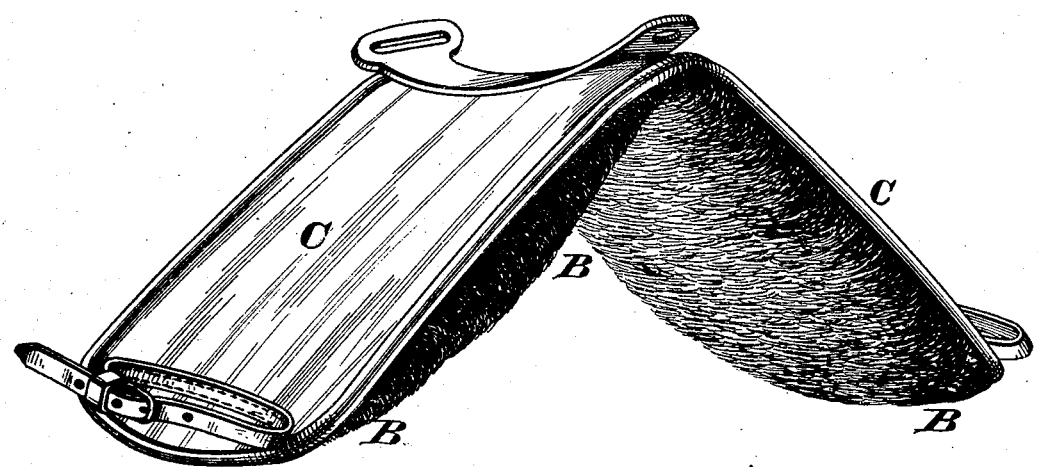

UNITED STATES PATENT OFFICE.

JULIUS ENGELKE, OF CINCINNATI, OHIO.

IMPROVEMENT IN HARNESS-PADS.

Specification forming part of Letters Patent No. 147,115, dated February 3, 1874; application filed November 21, 1873.

*To all whom it may concern:*

Be it known that I, JULIUS ENGELKE, of Cincinnati, Hamilton county, Ohio, have invented a new and useful Improvement in Harness, of which the following is a specification:

My invention relates to a new and useful mode of lining collars and other portions of harness which press heavily on the animal. This lining consists of hide with the hair on, so as to present hair instead of leather to the skin of the animal, with the beneficial result of permitting the sweat of the animal to pass off freely instead of being retained upon the animal's body, and of preserving the harness itself from becoming saturated with moisture.

In the accompanying drawings, Figure 1 represents a horse-collar, and Fig. 2 a harness-pad with my improvement.

The inner surface of the collar A or pad C is lined with leather, preferably cowhide, having the hair B still upon it, and so disposed as that the act of placing the piece of harness upon the animal shall not ruffle the hair upon said lining, said hair consequently lying smooth and even, and not acting to ruffle that upon the animal, but, on the contrary, by its porousness and slow conduction of heat and non-absorption, permitting free escape of the perspiration, and having no tendency to chill or injure the animal.

I am aware that sheepskin with the wool on has been used, but this differs essentially in effect from my invention, which is limited to the use of the skin of animals bearing hair. I am also aware that non-felting hair, curled, stitched, or otherwise secured to a backing, has been used before. This, therefore, I do not claim; but What I do claim, and desire to secure by Letters Patent, is—

The skin of an animal tanned with the hair on, as a lining for harness, as and for the purposes set forth.

In testimony of which invention I hereunto set my hand.

JULIUS ENGELKE.

Attest:
GEO. H. KNIGHT,
JOHN KITCH.